Figure 1:
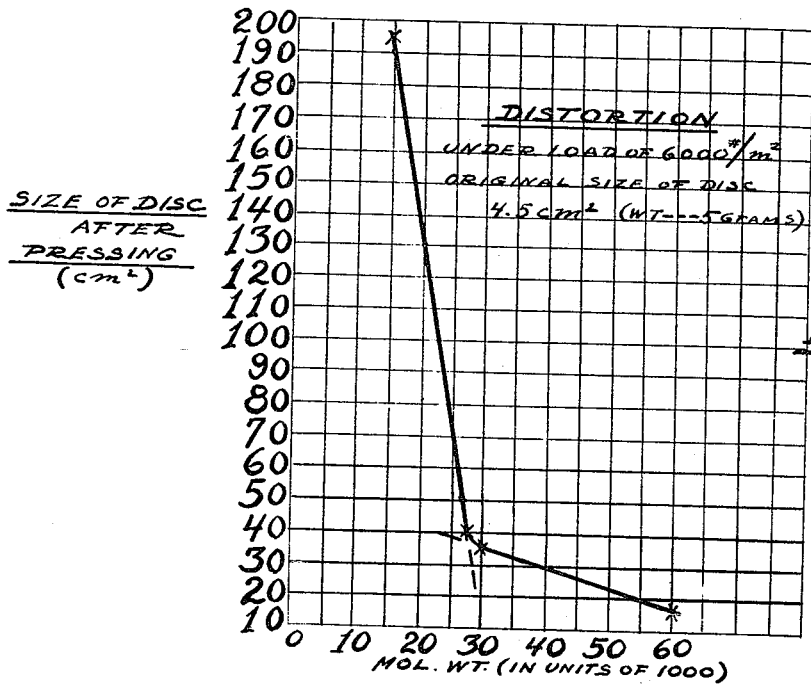

June 3, 1941.  R. ROSEN ET AL  2,244,021
POLYMER COMPOSITION
Filed Nov. 25, 1938

Raphael Rosen & Robert M. Thomas Inventors
By P. L. Young Attorney

Patented June 3, 1941

2,244,021

UNITED STATES PATENT OFFICE

2,244,021

POLYMER COMPOSITION

Raphael Rosen, Elizabeth, and Robert M. Thomas, Union, N. J., assignors to Standard Oil Development Company, a corporation of Delaware Application November 25, 1938, Serial No. 242,256

10 Claims. (Cl. 260—94)

The present invention relates to valuable polymerized substances, especially hydrocarbon polymers of high molecular weight which are stabilized against depolymerization caused by moderate heating. The invention will be fully understood from the following description.

Valuable polymers of high molecular weight can be prepared from olefines such as styrene or indene and similar compounds and especially iso-olefins such as isobutylene. These polymers are of the type known as linear or chain polymers, and this is because the polymerization proceeds linearly to produce chains of enormous length without ring formation. The polymers of isobutylene, which are the most desirable, contain no ring structure whatever. While those prepared from styrol and indene contain rings, these rings were present in the original structure of the polymerizable constituent and were not formed or altered during the polymerization.

The higher molecular weight substantially solid polymers, namely those having an average molecular weight above about 27,000 as determined by the viscosity method described in Staudinger's book, "Die Hochmolekularen Organischen Verbindungen," (Berlin, 1932) page 56, mentioned above and such polymers of isobutylene in particular, are quite sensitive to breakdown on moderate heating. Lower polymers, e. g. having a molecular weight of 5,000–10,000 or even 20,000 are substantially stable against such heat breakdown. The breakdown is not a heterogeneous cracking, but is a true depolymerization in which the original polymerized constituent is regenerated. Such instability has marked advantages in certain respects and for certain uses because the polymers, instead of cracking to leave a solid carbonaceous residue, depolymerize to gas or volatile liquid. While this is an extremely desirable property, it has been deemed advantageous to raise the temperature range in which decomposition occurs and to increase the time required for such decomposition. While the polymers as heretofore produced are stable for several hours at 100° C. it is found that on heating for a sufficient time, depolymerization is clearly evident by loss of weight of the polymer, and the general lowering of the molecular weight of the residue. At higher temperatures, say of 125° C. to 150° C., depolymerization is much more rapid.

It has now been found that the addition of relatively small amounts of certain materials greatly delays the rate at which depolymerization proceeds at any temperature, and apparently considerably raises the threshold value at which depolymerization becomes evident. The invention applies broadly to linear hydrocarbon polymers having a molecular weight above about 27,000 and is especially advantageous with such polymers having a molecular weight above 100,000. The materials employed comprise generally small amounts of aromatic compounds of a phenolic nature. The term "phenolic" is used in a broad sense to include materials in which a hydrogen atom is attached to the aromatic ring through an atom selected from among the negative elements from the sixth group of the periodic system $$-X-H$$

in which X represents an atom of oxygen, sulfur, selenium or tellurium. Of these materials, those containing sulfur and oxygen are the most desirable, not only because of the cheapness and greater ease of production, but also because they are more effective for the purpose in hand. Among such materials, the phenols, such as oxy- or thio-phenols, may be used but it is preferred to use alkylated phenols or alkylated thio-phenols in order to increase the ease of incorporation and the amount that can be added. For instance, some examples are: tertiary amyl phenol, tertiary amyl phenol sulfide, alpha- or beta naphthols or -thionaphthols or their alkylated derivatives, such as di-isobutyl t-amyl phenol, or arylated derivatives such as o-phenyl phenol.

It is also found desirable to use substances which contain additional atoms of oxygen or sulfur, that is to say, in addition to the —OH or —SH groups making the phenol or thio-phenol.

The additional oxygen atom may be present in the form of an additional hydroxyl group, as in the case of polyhydroxyl phenols or naphthols, such as hydroquinone or catechol, preferably alkylated to improve the solubility characteristics. But it may likewise be present in the form of an ether, that is to say, between two carbons containing radicals. In ethers of this sort one of the carbon containing radicals may be the aromatic ring on which the —OH or —SH group is attached. The other may be a similar group or it may be another aromatic group unsubstituted, or alkylated, or containing a —SH group as desired. It may also be a simple aliphatic group.

In the case where the additional atom is one of sulfur, it will be understood that it may comprise an additional —SH group as in the poly-thio-phenols. It may likewise be in the form of a sulfo-ether, that is to say, an ether in which the oxygen is substituted by a sulfur atom, i. e. mono-sulfide. Other compounds similar to the oxygen compounds mentioned above may be used in the same manner. It will be understood that disulfides may be used instead of mono-sulfides.

The aromatic nuclei may contain other substitutes such as hydroxyl, amino or carboxyl groups and halogen atoms, for instance, p-amino phenol in which one of the amino H atoms is replaced by an amyl group or a benzyl group, or the like.

In order to more clearly indicate the types of materials that can be used, the following formulae are given, but it will be understood that these are not to be taken as limitative, but only as illustrations of the types of compounds that can be used. Others coming within the broad definitions given above are equally satisfactory.

the purer the materials used, the higher will be the molecular weight produced.

In order to demonstrate that the polymer having a molecular weight of about 27,000 is critical, a series of different molecular weight isobutylene polymers ranging from 15,000 to 60,000 was prepared.

5 gr. samples of these were placed between polished brass plates in a 6" x 6" Carver press and were subjected to a pressure of 6000#/sq. in. while at room temperature to determine the permanent distortion of the samples. The initial cross sectional area of the samples as measured on the plate was 4.5 cm.$^2$ and the area was measured after the pressure was applied and further spread has substantially stopped.

It was found as shown in Fig. 1 of the drawing that in the range from 15,000 to 25,000 molecular weights the area increase was inversely propor-

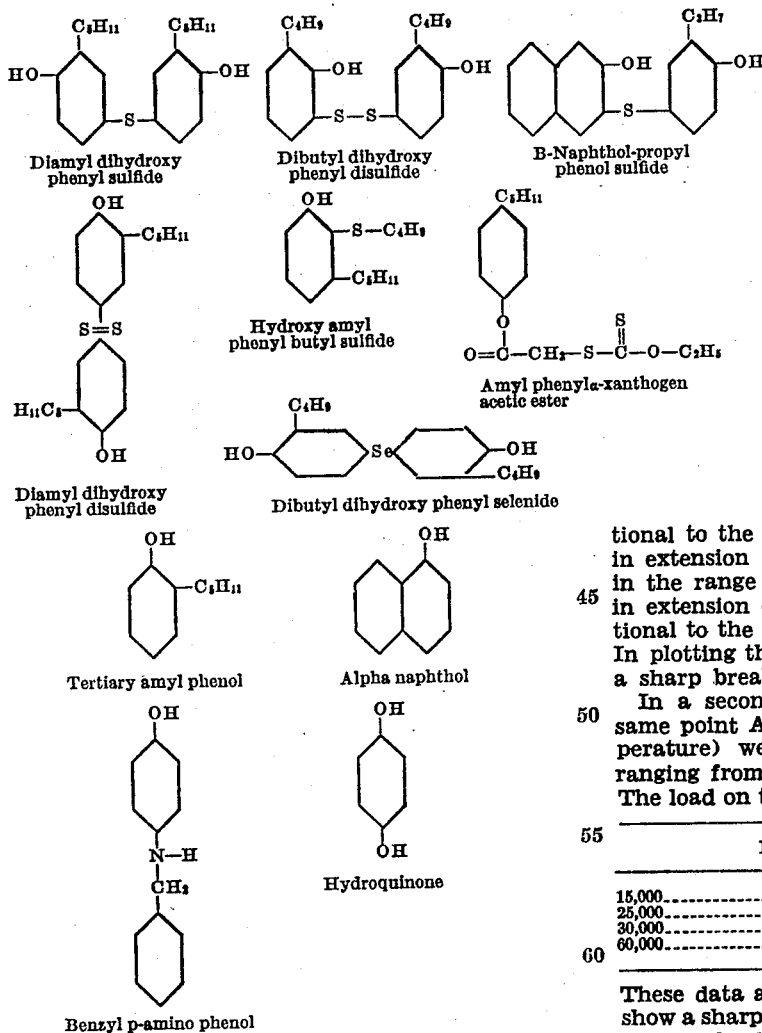

tional to the molecular weight and the decrease in extension of area was very rapid. Similarly in the range from 30,000 to 60,000 the decrease in extension of area was again directly proportional to the molecular weight but is very small. In plotting the two curves there was found to be a sharp break at a molecular weight of 27,500.

In a second series of tests to determine the same point A. S. T. M. penetrations (room temperature) were taken on a series of polymers ranging from 10,000 to 60,000 molecular weights. The load on the pin was 0 gr.

| Mol. Wt. | Penetration | Average |
|---|---|---|
| 15,000 | 80, 80 | 80 |
| 25,000 | 42, 37, 41 | 40 |
| 30,000 | 34, 33, 34 | 33.7 |
| 60,000 | 26, 27 | 26.5 |

Figure 2:
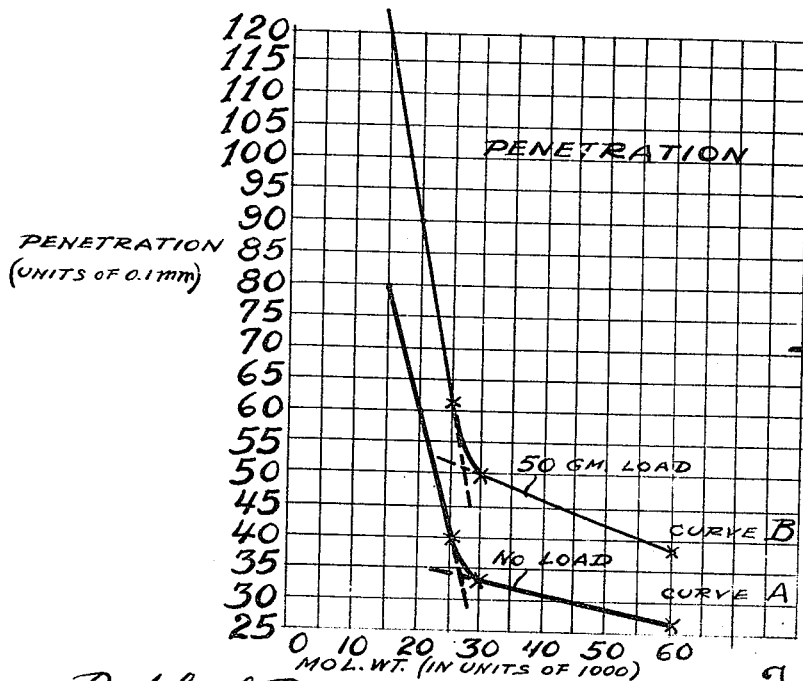

These data are plotted as curve A in Fig. 2 and show a sharp break at 27,500.

The polymers above may be prepared by any desired method for example, polymerization is preferably effected at very low temperatures, —10° C., preferably below —40° C. or even below —80° C. and similar catalysts of the same type such as by means of boron fluoride, aluminum chloride, or titanium chloride. The presence of even small amounts of compounds such as mercaptans, thioethers, alkyl fluorides, etc., which poison the polymerization, should be avoided if highest molecular weights are to be obtained. In general the lower the temperature used and In a third series of tests the load on the pin was 50 gr. and the data were collected as before:

| Mol. Wt. | Penetration | Average |
|---|---|---|
| 15,000 | 123, 120 | 121.5 |
| 25,000 | 64, 62, 64 | 63.3 |
| 30,000 | 54, 50, 52 | 53 |
| 60,000 | 37, 38 | 37.5 |

When the data in the above table are plotted on curve B in Fig. 2 of the drawing, there is found to be a sharp break at 27,500.

It is important to add the stabilizing agents mentioned above to the polymer after it has been produced and not to the original materials before polymerization because it has been found that the presence of the materials prevents or greatly decreases the rate of polymerization and the molecular weights that can be obtained by polymerization. The amount of the material added may be quite small but varies with the particular polymer with which it is used and the degree of increased stability desired. It is also desirable to increase the amount of the agent added, where higher molecular weight polymers are employed. In general, however, the amount of the material is less than 5% and may be even as low as .01%.

In order to avoid misunderstanding, it should be emphasized that the decomposition referred to above is not in any sense the result of oxidation, and the materials are not intended to and do not act as oxidation inhibitors, although it is known that most of them do act in such a manner in oils requiring such substances. The polymers, however, utilized in these compositions are extremely resistant to oxidation and ordinarily do not require any such protection against oxidation. In fact isobutylene polymers having a molecular weight above 27,000 have an iodine number (by the Hanus method) generally below 4 or 5 (cgs. I/gm.); a sample having an average molecular weight of 70,000 (substantially none under 40,000), purified by precipitation with liquid ethylene dichloride, had an iodine number of 1.6. The type of decomposition referred to in this case is strictly a depolymerization and is caused by the heat alone. The polymers are substantially saturated and act like saturated substances in respect to oxidation. They do not appear to be subject to auto-oxidation. It has been found that the polymers mentioned herein decompose by depolymerization at temperatures above 100° C., whether in the presence or in the absence of oxygen, and that the stabilizing agents disclosed above decrease the depolymerization rate whether in the presence or in the absence of oxygen.

In all of the following examples, the polymers used were prepared by the action of boron fluoride on highly purified liquid isobutylene. The polymerization was conducted at a temperature of about −100° C., using a liquefied inert hydrocarbon gas such as ethylene or ethane as diluent and internal refrigerant, and the polymer after washing to remove the excess catalyst, was a white or colorless solid mass that had the appearance of crepe rubber. It had a molecular weight of 140,000 as determined by Staudinger's viscosity method referred to above.

1. A sample of the polymer mentioned above, and samples to which tertiary amyl phenol sulfide and tertiary amyl phenol disulfide were added, respectively, in concentration of .1% were heated at 100° C. for extended periods. The molecular weight was measured on the product after heating period and the decomposition and the results of these tests are found in the table below:

| Sample | Temp. of test | Time of heating | Mol. weight after test |
|---|---|---|---|
| | °C. | Hours | |
| Polymer 140,000 mol. wt. | 100 | 64 | 9,000 |
| Polymer 140,000 mol. wt.+.1% tertiary amyl phenol sulfide | 100 | 400 | 124,000 |
| Polymer 140,000 mol. wt.+.1% tertiary amyl phenol di-sulfide | 100 | 400 | 120,000 |

The above results show that the polymer as prepared breaks down to a great extent in 64 hours at a temperature of 100° C. but the same polymer containing the addition of .1% of either of the two addition agents showed little decomposition for over 400 hours at the same temperature.

2. In order to obtain comparative results more quickly and at higher temperature, the above tests were repeated at 127° C.

| Sample | Temp. of test | Time of heating | Mol. weight after test |
|---|---|---|---|
| | °C. | Hours | |
| Polymer 140,000 mol. wt. | 127 | 3 | 34,000 |
| Polymer 140,000 mol. wt.+.1% tertiary amyl phenol sulfide | 127 | 3 | 130,000 |
| Polymer 140,000 mol. wt.+.1% tertiary amyl phenol disulfide | 127 | 8 | 36,000 |
| Polymer 140,000 mol. wt.+.2% tertiary amyl phenol sulfide | 127 | 8 | 121,000 |

The above shows that decomposition is much more rapid at 127° C. than at 100° C., and further that .1% of the addition agent is satisfactory to substantially prevent decomposition for about three hours, but that after that time decomposition becomes rapid. By doubling the amount of addition agents protection is extended to the 8 hour period.

3. In the following tests other addition agents were used:

| Sample | Temp. of test | Time of heating | Mol. weight after test |
|---|---|---|---|
| | °C. | Hours | |
| Polymer 140,000 mol. wt. | 127 | 3 | 34,000 |
| Polymer 140,000 mol. wt.+.1% tertiary amyl phenol | 127 | 3 | 56,000 |
| Polymer 140,000 mol. wt.+.5% beta thio naphthol | 127 | 8 | 90,000 |

These tests show that the simple phenols and the thio-phenols are effective, but also indicate that the thio-phenols are more desirable than the phenols, and further that neither are as effective as the materials used in the previous examples.

4. In the following examples, tests were made at 150° C. at which decomposition was quite rapid:

| Sample | Temp. of test | Time of heating | Results |
|---|---|---|---|
| | °C. | Hours | |
| Polymer 140,000 mol. wt. | 150 | 3 | 92% loss; residue an oily material. |
| Polymer 140,000 mol. wt.+.1% tertiary amyl phenol sulfide. | 150 | 3 | 12% loss by wt.; residue 48,000 m. w. |

5. The following tests show how much more sensitive the isobutylene polymers of exceedingly high molecular weight are as compared to those of only moderately high molecular weight.

| Sample | Original mol. wt. | Mol. wt. after heating 19 hrs. at 130° C. |
|---|---|---|
| 1 Polyisobutylene A | 15,000 | 13,000 |
| 2 Polyisobutylene B* | 110,000 | 30,000 |

*Thoroughly milled to insure uniformity.

These results indicate that after 19 hours of heating at 130° C. polyisobutylene A, having an original molecular weight of 15,000, had decreased only 13% in molecular weight whereas in test 2 polyisobutylene B, having an original molecular weight of 110,000, decreased 64% in molecular weight.

6. The following tests show additional stabilizing results obtained by various phenolic compounds.

| | Sample | Original mol. wt. | Mol. wt. after heating 19 hrs. at 130° C. |
|---|---|---|---|
| 2 | Polyisobutylene B* | 110,000 | 30,000 |
| 3 | Same as No. 2+1% di-tertiary butyl cresol | 110,000 | 105,000 |
| 4 | Same as No. 2+1% di-isobutyl tertiary amyl phenol | 110,000 | 102,000 |
| 5 | Same as No. 2+1% alpha naphthol | 110,000 | 95,000 |
| 6 | Same as No. 2+1% ter. butyl catechol | 110,000 | 92,000 |
| 7 | Same as No. 2+1% o-cresol | 110,000 | 92,000 |
| 8 | Same as No. 2+1% o-phenyl phenol | 110,000 | 92,000 |

*Thoroughly milled to insure uniformity.

As the most effective compounds were di-tertiary butyl cresol and di-isobutyl tertiary amyl phenol, it is apparently necessary that the phenol contain one or more alkyl groups of substantial size in order to make it sufficiently soluble in the polyisobutylene to be effective as a stabilizer.

While the above invention is particularly useful and has been illustrated for use in connection with synthetic polymers, it will be understood that the addition agents may also be used with modified natural polymers, such as hydrogenated rubber or guttas and balatas, and with hydrogenated polymers of diolefins such as isoprene and butadiene.

The present compositions may be used as such, or they may be used in connection with other compositions, for example, the heat stabilizing material may be used as an ingredient for a lubricating composition, such as oils and greases, or for various other uses to which the ordinary polymers are susceptible.

This application is a continuation-in-part of Serial No. 92,506, filed July 25, 1936 and issued as Patent No. 2,160,172.

The present invention is not to be limited to any theory of the action of the materials used nor to any particular polymers, but only to the following claims in which it is desirable to claim all novelty inherent to the invention.

We claim:

1. A polymer composition of increased stability toward heating comprising essentially an isobutylene polymer having a molecular weight above about 27,000 and 0.01% to 5% of an aromatic compound containing a —XH group attached to the aromatic nucleus, in which X is a negative element of the sixth group of the periodic system.

2. A polymer composition comprising an isobutylene polymer having a molecular weight above about 27,000 normally subject to depolymerization at temperatures above about 100° C., having been stabilized against such depolymerization by having incorporated therein about 0.01% to 5% of a hydroxy aromatic compound.

3. A composition comprising a substantial amount of polyisobutylene having a molecular weight above about 27,000 and a small amount of tertiary amyl phenol.

4. A polymer composition of increased stability toward heating, comprising a linear hydrocarbon polymer having a molecular weight above 27,000 and normally subject to depolymerization at temperatures above about 100° C. and a minor amount of an aromatic compound containing a —XH group attached to the ring nucleus of said compound, in which X is a negative element of the sixth group of the periodic system.

5. A composition according to claim 4, in which the polymer is selected from the group consisting of iso-olefin polymers, hydrogenated diolefin polymers, and hydrogenated natural rubber-like polymers, and said aromatic compound is an alkylated phenolic compound.

6. A stabilized polymer composition comprising a high molecular weight linear hydrocarbon polymer in solid form that is not normally subject to auto-oxidation but is normally subject to depolymerization at temperatures above about 100° C., and incorporated therein a small amount of an aromatic compound containing a —XH group attached to the aromatic nucleus of said compound, in which X is a negative element of the sixth group of the periodic system, to retard depolymerization of said polymer.

7. A composition as described in claim 6, in which said polymer has a molecular weight above about 100,000.

8. A composition according to claim 2, in which said hydroxy aromatic compound is a polynuclear phenolic compound.

9. A composition according to claim 2, in which said hydroxy aromatic compound contains an amino group attached to the aromatic nucleus.

10. A composition according to claim 2, in which said hydroxy aromatic compound is an alkylated phenolic compound.

RAPHAEL ROSEN.
ROBERT M. THOMAS.